United States Patent [19]
Weissgerber

[11] Patent Number: 5,207,514
[45] Date of Patent: May 4, 1993

[54] MOUNTING, IN PARTICULAR FOR DISK SPINDLES

[75] Inventor: Alois Weissgerber, Schweinfurt, Fed. Rep. of Germany

[73] Assignee: Fag Kugelfischer Georg Schafer KGAA, Fed. Rep. of Germany

[21] Appl. No.: 855,050
[22] PCT Filed: Jul. 31, 1991
[86] PCT No.: PCT/DE91/00625
  § 371 Date: May 6, 1992
  § 102(e) Date: May 6, 1992
[87] PCT Pub. No.: WO92/04550
  PCT Pub. Date: Mar. 19, 1992

[30] Foreign Application Priority Data
Sep. 6, 1990 [DE] Fed. Rep. of Germany ....... 4028273

[51] Int. Cl.$^5$ .............................................. F16C 35/06
[52] U.S. Cl. ................................. 384/497; 384/512; 384/518; 384/519; 384/537
[58] Field of Search ............... 384/497, 495, 519, 512, 384/518, 537

[56] References Cited

U.S. PATENT DOCUMENTS
2,919,942 1/1960 Bechtel ............................. 384/497
4,969,754 11/1990 Rohrer et al. ..................... 384/512

FOREIGN PATENT DOCUMENTS
2008385 9/1971 Fed. Rep. of Germany .
3447150 7/1986 Fed. Rep. of Germany .
2209423 6/1974 France .

Primary Examiner—Lenard A. Footland
Attorney, Agent, or Firm—Ostrolenk, Faber, Gerb & Soffen

[57] ABSTRACT

In a mounting for disk spindles, an embodiment is provided in which, despite simple construction and simple assembly of the bearing, a high degree of precision is obtained. The angle ball bearings in O-arrangement have outer rings (4) the race (4') of which has, in longitudinal section, a radius the center point (7) of which lies on the axis of rotation (8) of the inner races (2).

7 Claims, 1 Drawing Sheet

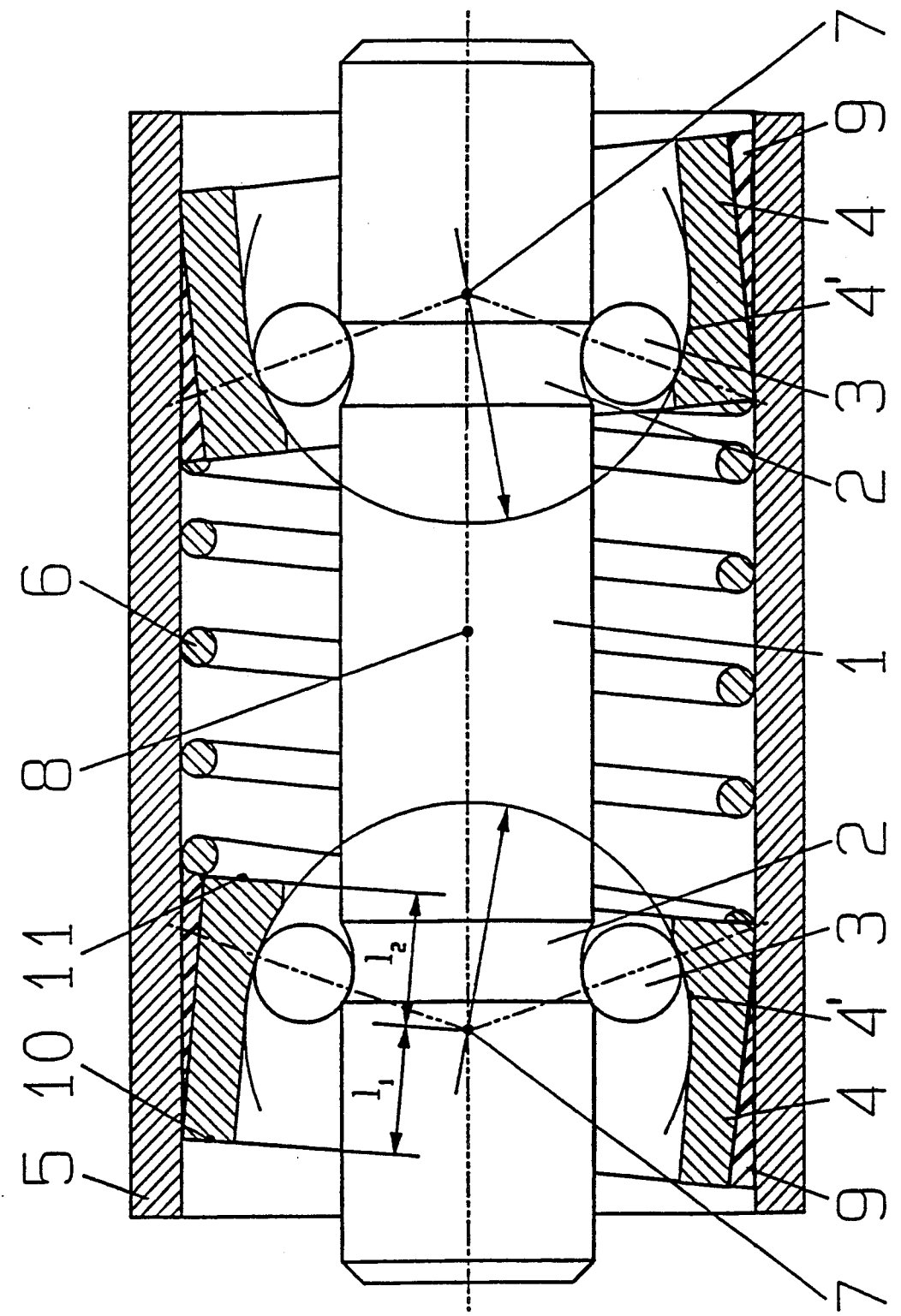

MOUNTING, IN PARTICULAR FOR DISK SPINDLES

The present invention relates to a mounting for disk spindles, particularly to two angle ball bearings clamped spaced apart on a shaft, a nd particularly to minimizing the effect of non-parallel alignment of the outer ring races of the bearings a bearing.

Mountings for disk spindles have been known and used for many years (see, for instance, SKF Kugellagerzeitschrift 232, 4/1988). Up to now embodiments have always been selected in which two deep-groove ball bearings or two angular ball bearings are arranged on the shaft at a certain distance apart and are clamped axially with respect to each other so that the desired freedom from play is obtained. Since smaller disks and disks of higher storage capacity are constantly being developed, it has been necessary to increase the precision of the mountings. Therefore, the bearings of the spindles were improved by, for instance, by including fewer structural parts and/or having fewer fitting and joining surfaces also. One improvement was that special inner rings were avoided by arranging the travel path of the balls directly in the shaft. Assembly-produced tilting with respect to each other of the inner-ring races was thereby excluded. The parallel alignment of the outer-ring races is also a prerequisite for optimal rolling conditions in the bearing. However, because of the tolerances in the fitting and joining surfaces of the outer rings, completely parallel alignment of the outer-ring races with respect to each other cannot be achieved. This has produced variations in the pressure angle in the circumference of the race which have a negative effect on the rolling conditions and thus on the precision of the mounting.

The object of the invention is to develop the aforementioned bearings so as to obtain high precision despite simple construction and simple assembly of the bearings.

The two bearings, which are clamped axially with respect to each other, are similar to two angular contact ball bearings. However, due to the fact that their races form sections of spherical surfaces with the center point on the axis of rotation, tilting of the outer rings with respect to each other is possible without variations in pressure angle occurring around the circumferential direction of the race. This is an important condition for high precision of the bearing. Due to the fact that the resultant pressing force of the compression spring does not act concentrically to the outer rings, the outer rings tilt in the bore of the sleeve.

If the distance between one axial end surface of the outer ring and the point of intersection of the pressure line of the bearing balls on the axis of rotation is made the same size as the distance between that point of intersection and the other end surface of the bearing, self-centering of the longitudinal axis of the bearing in the bore of the sleeve is obtained. Thus, the slot width between the outer rings and the sleeve has no effect on the central seating of the outer rings in the bore of the sleeve. The manufacturing tolerances for the sleeve bore and outer-ring diameter can be larger. The gaps produced between the outer rings and the sleeve bore are then filled with an adhesive which hardens. In this way, movements between the outer rings and the sleeve are avoided.

Despite obtaining maximum precision of the bearing, parallel alignment of the outer rings to each other and centering of the outer rings in the bore of the sleeve is therefore no longer necessary here.

BRIEF DESCRIPTION OF THE DRAWING

The invention will be explained further with reference to the drawing which is a longitudinal section through the mounting of a disk spindle.

Referring to the drawing, the mounting comprises a shaft in which there are worked the inner races 2 for two angle ball bearings, each bearing comprising a row of balls 3, of the outer ring 4 for the row of balls and a sleeve 5 around the outer ring. Between the outer rings 4, which are spaced apart from each other, there is a compression spring 6 which clamps the outer rings axially with respect to each other and urges the outer rings apart. Therefore, each bearing ball row is pressed axially outward from the other row and against the axially outward region of the respective inner race.

In accordance with the invention, the race 4' of each outer ring 4 is so profiled that it forms a partial spherical surface, the center point 7 of the radius lying on the longitudinal axis of rotation 8 of the inner races 1'. In this way, tilting of either or both of the outer rings 4 in the sleeve 5 is possible without changes in pressure angle occurring, since, in every position of tilt, the balls 3 are always opposite the same spherical surface. Upon assembly, an adhesive is introduced into the gaps 9 produced by the tilting of either outer rings, the adhesive then hardening and fixing the outer rings 4 in position in the sleeve 5.

The pressure lines 7 from all of the balls in each of the bearings are directed both radially inwardly and axially outwardly by the races of the outer ring and the force of the spring 6 on that ring. If the distance 11 between the one end surface 10 of the outer rings 4 and the point of intersection 7 of the pressure lines on the axis 8 is made equal to the distance $l_2$ between the point of intersection 7 and the other end surface 11 of the outer rings 4, self-centering of the axis of rotation (8) takes place within the bore of the sleeve 5. In this way, the influence of manufacturing tolerances on the precision of the mounting is eliminated.

I claim:

1. A mounting for a disk spindle, comprising a shaft, two axially spaced apart angular ball bearings on the shaft, means clamping the ball bearings axially apart on the shaft;
    each ball bearing comprising a row of bearing balls around the shaft, an inner race defined in the shaft for the balls in a row and an outer ring including an outer face around the row of balls; each outer race being shaped along a longitudinal section thereof to have a radius which lies approximately on the axis of rotation of the shaft and the outer races being free to tilt around the center point of the surface of the race under the influence of the clamping means.

2. The mounting of claim 1, further comprising a sleeve around the outer rings and spaced therefrom to enable tilting of the outer rings with respect to the shaft under the influence of the clamping means.

3. The mounting of claim 2, further comprising means for fixing the tilt orientation of the outer rings in the sleeve once the tilt orientations are set by the clamping means.

4. The mounting of claim 2, wherein the clamping means urge the outer rings axially apart.

5. The mounting of claim 4, wherein the inner races are shaped to oppose movement axially apart of the outer rings by means of the outer rings engaging the respective rows of bearing balls for urging the rows of bearing balls axially apart while the inner races oppose axially outward movement of the rows of bearing balls, the rows of bearing balls having resultant lines of pressure which develop from the action of the clamping means;

the outer rings each having axially opposite end surfaces; the outer ring is so shaped and the outer race thereof is so shaped that a first distance between one of the end surfaces of each outer rings and the point of intersection of the pressure lines of the respective row of bearing balls in the axis of rotation is equal to a second distance between the other end surface of that outer ring and the same point of the intersection of the pressure lines of the respective row of bearing balls on the axis of rotation.

6. The mounting of claim 5, wherein each outer race is a partial sphere such that the outer ring may tilt.

7. The mounting of claim 6, the outer race partial sphere has a center on the point of intersection of the pressure lines of the respective row of bearing balls on the axis of rotation.

* * * * *